(12) United States Patent
Narain et al.

(10) Patent No.: US 8,578,443 B2
(45) Date of Patent: Nov. 5, 2013

(54) REAL-TIME MOBILE APPLICATION MANAGEMENT

(75) Inventors: Arvind Narain, Fremont, CA (US); Kuppuswami Dilip, Fremont, CA (US)

(73) Assignee: Mobileasap, Inc., Fremont, CA (US)

( * ) Notice: Subject to any disclaimer, the term of this patent is extended or adjusted under 35 U.S.C. 154(b) by 0 days.

(21) Appl. No.: 13/481,704

(22) Filed: May 25, 2012

(65) Prior Publication Data

US 2012/0311659 A1    Dec. 6, 2012

Related U.S. Application Data

(60) Provisional application No. 61/492,305, filed on Jun. 1, 2011.

(51) Int. Cl.
*H04L 29/06* (2006.01)

(52) U.S. Cl.
USPC .................................. 726/1; 726/26

(58) Field of Classification Search
USPC ............................................... 726/1
See application file for complete search history.

(56) References Cited

U.S. PATENT DOCUMENTS

| | | | | |
|---|---|---|---|---|
| 2006/0047770 | A1* | 3/2006 | Marappan et al. | 709/207 |
| 2008/0064383 | A1* | 3/2008 | Nath et al. | 455/418 |
| 2008/0109871 | A1* | 5/2008 | Jacobs | 726/1 |
| 2009/0178132 | A1* | 7/2009 | Hudis et al. | 726/12 |
| 2012/0131685 | A1* | 5/2012 | Broch et al. | 726/30 |

* cited by examiner

*Primary Examiner* — Yogesh Paliwal
(74) *Attorney, Agent, or Firm* — Maschoff Brennan

(57) ABSTRACT

Some embodiments relate to mobile application management. An example embodiment includes a method of mobile device management. The method includes installing a client-side engine of an enforcement engine on a mobile device. The enforcement engine further includes a runtime engine. The method also includes routing communications between the mobile device and a network/cloud or an enterprise network through the enforcement engine. In addition, the method includes generating a policy regarding the mobile applications from a signature database ("SigDB"). The SigDB includes signatures pertaining to mobile applications. Compliance of the mobile device with the policy is enforced in real time.

20 Claims, 10 Drawing Sheets

| Signature Criteria 312 | First Mobile Application 314A | Second Mobile Application 314B | ... | Nth Mobile Application 314C |
|---|---|---|---|---|
| Mobile Application Name 312A | | | | |
| Mobile Application Description 312B | | | | |
| Mobile Application Unique Identifier 312C | | | | |
| Mobile Application Version Number 312D | | | | |
| Mobile Application Tags 312E | | | | |
| Public Vs. Private Flag 312F | | | | |
| Cloud Vs. Native Flag 312G | | | | |
| Mobile Application Download URL 312H | | | | |
| Mobile Application Risk Level 312I | | | | |
| Mobile Application Characteristic 312J | | | | |
| Vulnerabilities 312K | | | | |
| URL Reputation 312L | | | | |
| IP Reputation 312M | | | | |
| Mobile Application Access URLs 312N | | | | |
| HTTP URL Traffic Generated By A Mobile Application 312O | | | | |
| IP Address For Accessing The HTTP Sites 312P | | | | |
| A Target Platform 312Q | | | | |
| A Mobile Application Binary Code 312R | | | | |
| A Mobile Application Traffic URL 312S | | | | |
| A Mobile Application Type 312T | | | | |
| A Mobile Application Category 312U | | | | |

| | Public Mobile Application 536 | Private Mobile Application 538 |
|---|---|---|
| Native Mobile Application 532 | Default Rule: 540<br>Allow Public Mobile Applications Except Blocked [Blacklist]<br><br>Enforcement:<br>Client-Side Engine: Blocks Mobile Application When Blacklisted Mobile Application Is Launched On The Mobile Device.<br><br>Runtime Engine: Drops Application Traffic For Blacklisted Public Mobile Applications. Allow All Other Traffic | Default Rule: 542<br>Block Every Private Mobile Application Except Provisioned [Whitelist]<br><br>Enforcement:<br>Client-Side Engine: Blocks All Private Mobile Application When Mobile Application Is Launched Except Whitelisted Applications.<br><br>Runtime Engine: Drops Application Traffic For All Private Mobile Applications Except Whitelisted Application Traffic Is Allowed |
| Cloud-Based Mobile Application 534 | Default Rule: 544<br>Allow Public Mobile Applications Except Blocked [Blacklist]<br><br>Enforcement:<br>Client-Side Engine: Prevents User From Accessing Blacklisted Public Mobile Applications. Allow All Others.<br><br>Runtime Engine: Drops Application Traffic For Blacklisted Public Mobile Applications. Allow All Other Traffic. | Default Rule: 546<br>Block Every Private Mobile Application Except Provisioned [Whitelist]<br><br>Enforcement Strategy:<br>Client-Side Engine: Prevents User From Accessing All Private Mobile Application From Mobile Device Browser Except Whitelisted Applications.<br><br>Runtime Engine: Drops Application Traffic For All Private Mobile Applications Except Whitelisted Application Traffic Is Allowed. |

*Fig. 5*

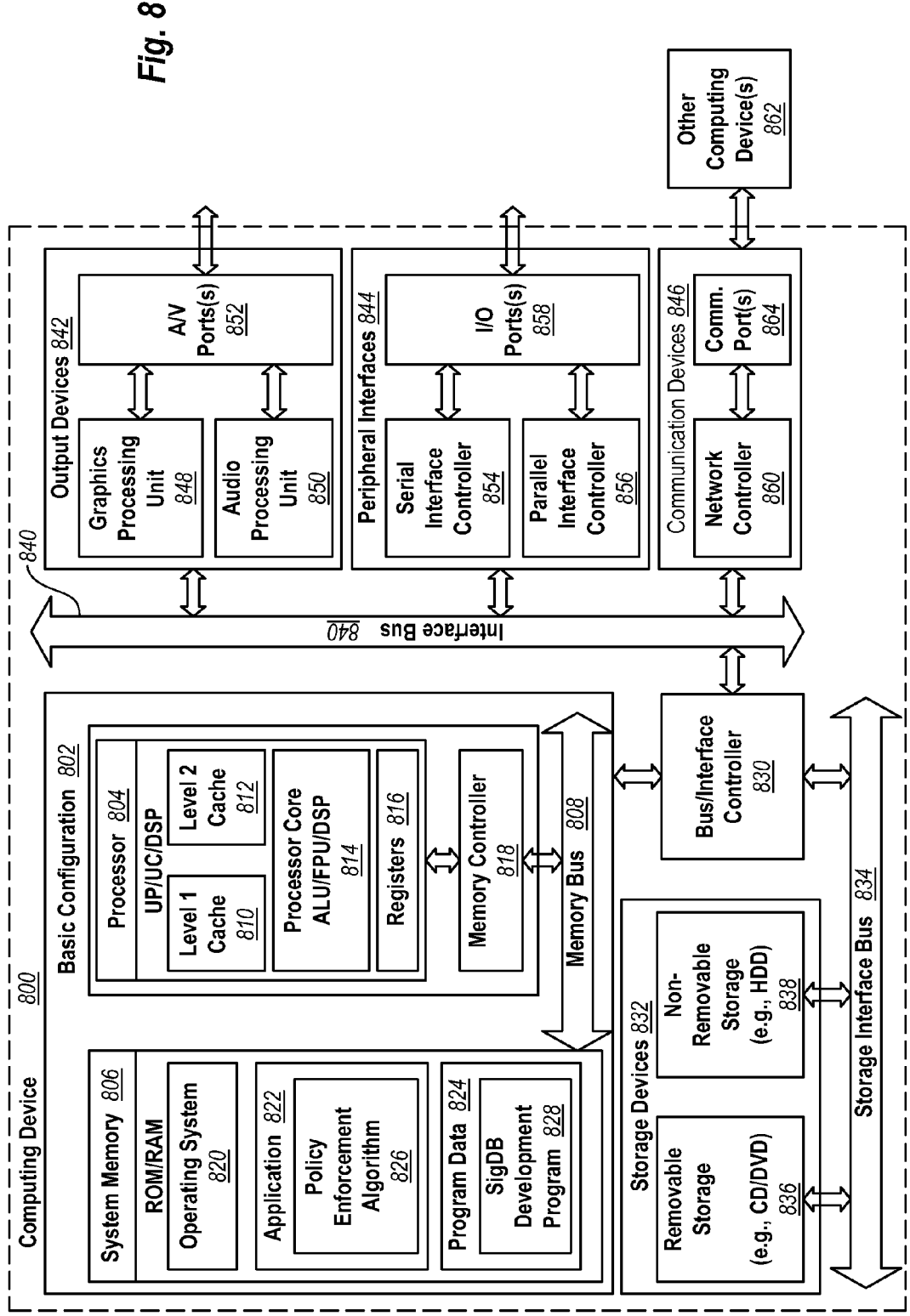

REAL-TIME MOBILE APPLICATION MANAGEMENT

CROSS-REFERENCE TO RELATED APPLICATIONS

This application claims the benefit of and priority to U.S. Provisional Application No. 61/492305, filed on Jun. 1, 2011, which is incorporated herein by reference.

BACKGROUND

1. Field of the Invention

Embodiments described herein generally relate to enterprise mobility. More particularly, some example embodiments relate to mobile application management.

2. Related Technology

In bring-your-own-device ("BYOD") environments, users provide mobile devices, which are likely owned by the users, to interface with an enterprise. Public mobile applications may be already loaded on the mobile devices. The public mobile applications may have been purchased, accessed, or downloaded from an application store, such as iTunes. In addition, the users may seek to add public mobile applications to the mobile device by purchasing public mobile applications from the application store. The mobile devices may also be configured to interface with a user's private data such as personal files and/or private email accounts, for example. Additionally, the enterprise may load and/or provide access to private mobile applications. The private mobile applications may include enterprise email services or access to enterprise files, for example. Because the users provide the mobile devices, the users often expect to use or add the public mobile applications and access personal data. However, by using the public mobile applications, accessing personal data, and being provided access to private applications, the users may expose the enterprise to vulnerabilities including, but not limited to, malware, malicious applications, network sniffers, applications that consume excessive network bandwidth, applications that encourage data leakage, applications that reduce the users' productivity, applications with inappropriate content, applications that reduce battery life, or some combination thereof.

To manage and/or reduce exposure to such vulnerabilities, mobile device management ("MDM") has developed. One aspect of MDM may include mobile application management ("MAM") that includes management of the private mobile applications, the public mobile applications, and mobile risk management related to the mobile devices. For example, MAM may include features designed to "provision" one or more mobile applications. As used herein, to provision a mobile application may refer to the enterprise deeming the mobile application acceptable. That is, once a mobile application has been provisioned, the enterprise may allow the use of and/or access to the mobile application. A list of provisioned applications may be referred to as a "whitelist." In whitelists, all mobile applications default as not included and/or not provisioned and thus the use thereof may not be allowed. Furthermore, the enterprise may have to individually provision each public mobile application included in the whitelist.

Additionally, the MAM may include an application interface similar to an application store from which the provisioned applications may be made available to users or a specific group of users. The application interface may authenticate users prior to allowing access to the provisioned applications. In addition, the MAM may monitor access and/or use of provisioned applications and/or erase non-provisioned applications from the mobile devices. Thus, the whitelist and the application interface may conflict with the expectations of the users who own the mobile devices. Moreover, the whitelists and the application interface may require significant investment of time and resources by the enterprise.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF SOME EXAMPLE EMBODIMENTS

Embodiments described herein generally relate to enterprise mobility. More particularly, some embodiments relate to mobile application management.

An example embodiment includes a method of mobile device management. The method includes installing a client-side engine of a policy enforcement engine (enforcement engine) on a mobile device. The enforcement engine further includes a runtime engine. The method also includes routing communications between the mobile device and a network/cloud or an enterprise network through the enforcement engine. In addition, the method includes generating a policy regarding the mobile applications from a signature database ("SigDB"). The SigDB includes signatures pertaining to mobile applications. Compliance of the mobile device with the policy is enforced in real time.

Another example embodiment includes a method of mobile application management in a bring your own device ("BYOD") environment. The method includes publishing at least one signature of at least one mobile application in a SigDB. The signature includes information indicating whether the mobile application is a private mobile application or a public mobile application. The signature also includes information about vulnerabilities introduced to an enterprise by the mobile application. The method further includes provisioning at least one private mobile application. Provisioning includes enabling a first user to use the private mobile application. The method also includes by default, blocking the mobile applications defined as private mobile applications except the at least one private mobile application that is provisioned. In addition, the method includes blocking the at least one public mobile application based on the information about vulnerabilities and by default, allowing use of the mobile applications defined as public mobile applications except the at least one public mobile application that is blocked.

Another example embodiment includes a BYOD environment mobile application management system. The system includes a computing device including a computer-readable medium having computer-executable instructions stored thereon that are executable by the computing device. The computer-executable instructions include an enforcement engine and a customizable policy. When executed by the computing device, the enforcement engine manages in real time mobile applications on the mobile device and traffic related to mobile applications in the network/cloud. Additionally, when executed, the customizable policy forms the basis of the enforcement engine management.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, some embodiments of the invention will be illustrated in the appended drawings. It is appreciated that these drawings depict only some embodiments of the invention and are therefore not to be considered limiting of its scope. The invention will be described and explained with additional specificity and detail through the use of the accompanying drawings in which:

FIG. 3B is an example signature database ("SigDB") that may be implemented in the mobile application management system of FIG. 3A;

FIG. 5 is an example policy organized as a 2×2 matrix that may be implemented in the mobile application management system of FIG. 3A;

FIG. 8 is a block diagram illustrating an example computing device arranged for operation of the mobile management system of FIG. 3A.

DETAILED DESCRIPTION OF SOME EXAMPLE EMBODIMENTS

Embodiments described herein generally relate to enterprise mobility. More particularly, some embodiments relate to mobile application management. In an example embodiment, a mobile application management system, which may be implemented in a bring your own device ("BYOD") environment, includes a policy enforcement engine (enforcement engine). The enforcement engine includes a client-side engine installed on a mobile device and a runtime engine installed on a network/cloud or an enterprise network. The enforcement engine manages mobile applications on the mobile device and traffic related to mobile applications in the network/cloud. The management performed by the enforcement engine is based on a customizable policy generated from a signature database ("SigDB"). The management occurs in real time. The mobile application management system avoids unwarranted intervention with the mobile device while safeguarding an enterprise's security interests by allowing public mobile applications unless blacklisted and by blocking private mobile applications unless whitelisted.

Figure 1A:
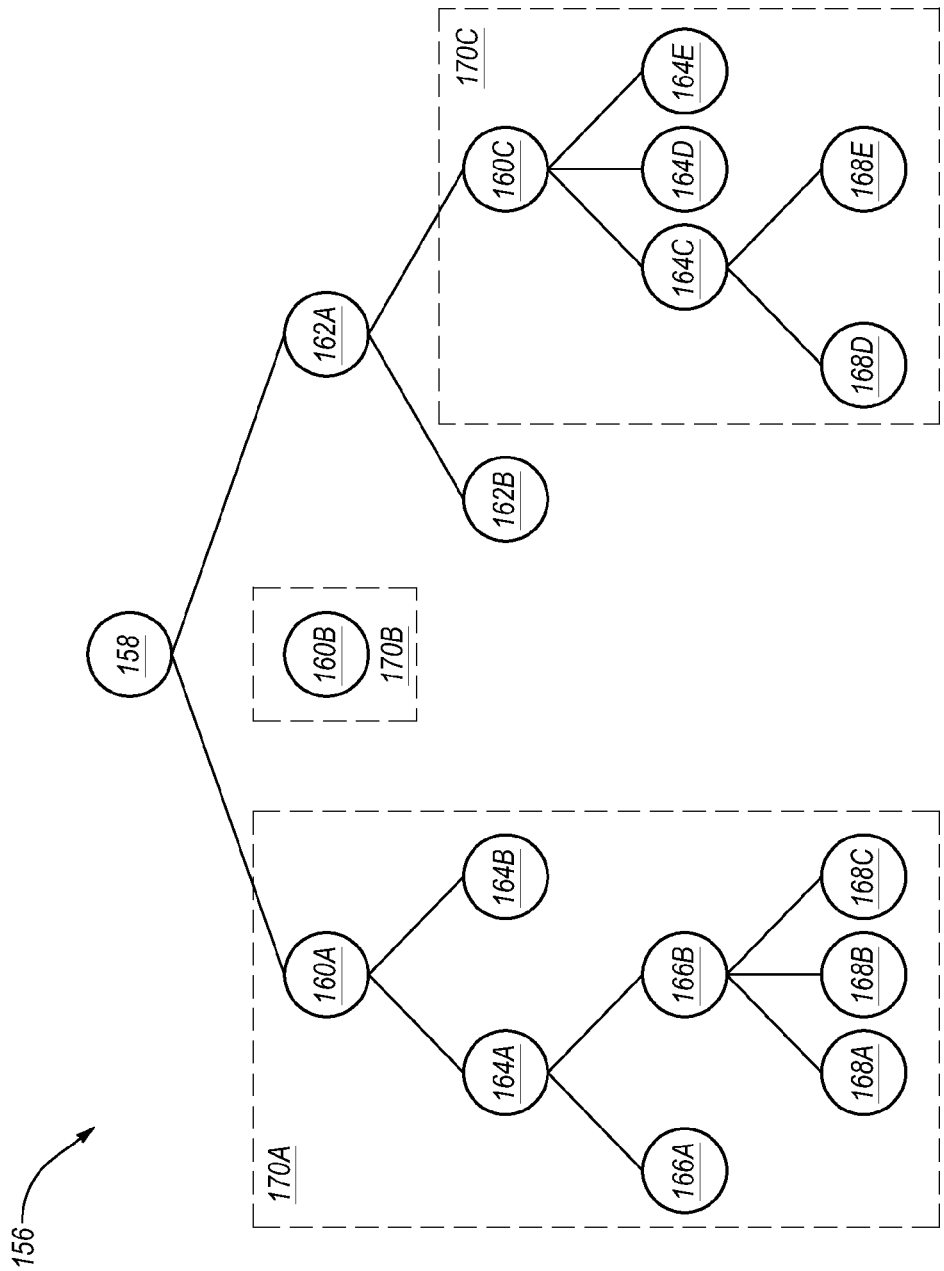
FIG. 1A is a diagram of an example mobile enterprise management platform structure.

Referring to FIG. 1A, a diagram of an example mobile enterprise management platform structure (platform structure) 156 is illustrated. Generally, the platform structure 156 may accommodate a multi-tenant system in which each tenant represents an enterprise customer 160A-160C (generally, an enterprise customer or enterprise customers 160). Within the platform structure 156 the enterprise customers 160 may manage mobile applications (not shown), devices (not shown), users 168A-168E (generally, a user or users 168), and policies (not shown) within the context of an enterprise substructure 170A-170C (generally, a substructure or substructures 170). The platform structure 156 may enable each of the enterprises customers 160 to become a logical unit that may be separate from the other enterprise customers 160 included in the platform structure 156.

The platform structure 156 may include a super administrator 158. The super administrator 158 may generally oversee and/or manage the platform structure 156. For example, the super administrator 158 may set up and maintain the substructures 170, sell and/or enable services related to the platform structure 156, etc. In some embodiments, the super administrator 158 is centrally managed by a single administrator. Additionally, in some embodiments, the platform structure 156 may include reseller administrators 162A and 162B. The reseller administrators 162A and 162B generally provide similar oversight and/or management as the super administrator 158 but the reseller administrators 162A and 162B may be limited to some portion of the platform structure 156.

In some embodiments, the platform structure 156 and/or the substructures 170 may be organized in a hierarchy of organizational units 160A-160C, 162A-162B, 164A-164E, 166A-166B, 168A-168E (generally, an organizational unit or organizational units 160/162/164/166/168). In this way, the configuration of the platform structure 156 and/or the substructures 170 may be intended to model or minor that of enterprises. The substructure 170 may be a basis of policies that serve as the basis of mobile device management within the platform structure. Some additional details of the policies are discussed below.

Specifically, in this and other embodiments, the enterprise structure 156 may include one or more of the enterprise customers 160. The enterprise customers 160 may be at a lower level in the platform structure 156 than the super administrator 158 and/or the reseller administrator 162A and 162B. Accordingly, the super administrator 158 and/or the reseller administrators 162A and 162B may oversee and/or manage the enterprise customers 160 as discussed above. The enterprise customers 160 may represent one of the tenants of the enterprise structure 156 and further represent an enterprise, a combination of enterprises, or some portion of an enterprise. Each of the enterprise customers 160 may be a delineation point of one of the substructures 170. For example, a first enterprise customer 160A is the delineation point to a first substructure 170A.

Below the enterprise customers 160 in the platform structure 156 may be one or more business units 164A-164E, departments 166A-166B, users 168, some combination thereof, or one or more additional organizational units 160/162/164/166/168 representing some sub hierarchal-unit. Within each of the substructures 170, a manner of mobile device management and/or the policy may be customized to the enterprise customer 160 associated therewith.

For example, in the first substructure 170A, the first enterprise customer 160A may set up a logical unit including a first business unit 164A and a second business unit 164B in a first level. Stemming from the first business unit 164A, there may be a first department 166A and a second department 166B in a second level. Stemming from the second department 166B there may be a first user 168A, a second user 168B, and a third user 168C in a third level. Accordingly, the manner of mobile device management and/or the policy may be customized to a particular user 168 such as the first user 168A, may be customized to a particular set of users 168 such as the first user 168A and the second user 168B, may be customized to a particular department 166 such as the second department 166B that includes the first user 168A, the second user 168B, and the third user 168C, etc. In contrast, in a third substructure 170C, a third enterprise customer 160C may set up a second logical unit that is separate from the first substructure 170A and may include a different manner of mobile device management and/or a different policy.

The platform structure 156 is illustrative and not meant to be limiting. There is no restriction on the number of levels, the number of organizational units 160/162/164/166/168 in the substructures 170, the number of reseller administrators 162A and 162B, the number of substructures 170, etc.

Additionally one or more of the organizational unit 160/162/164/166/168 may be included at any level in the platform structure 156. For example, the first substructure 170A includes three levels while the third substructure 170C includes two levels. Additionally, the platform structure 156 may not be static. That is, any organizational unit 160/162/164/166/168 stemming from any other organizational unit 160/162/164/166/168 may be changed at any time. Alternatively, in some embodiments, the organizational units may be fixed or otherwise restricted in association, without limitation.

Figure 1B:
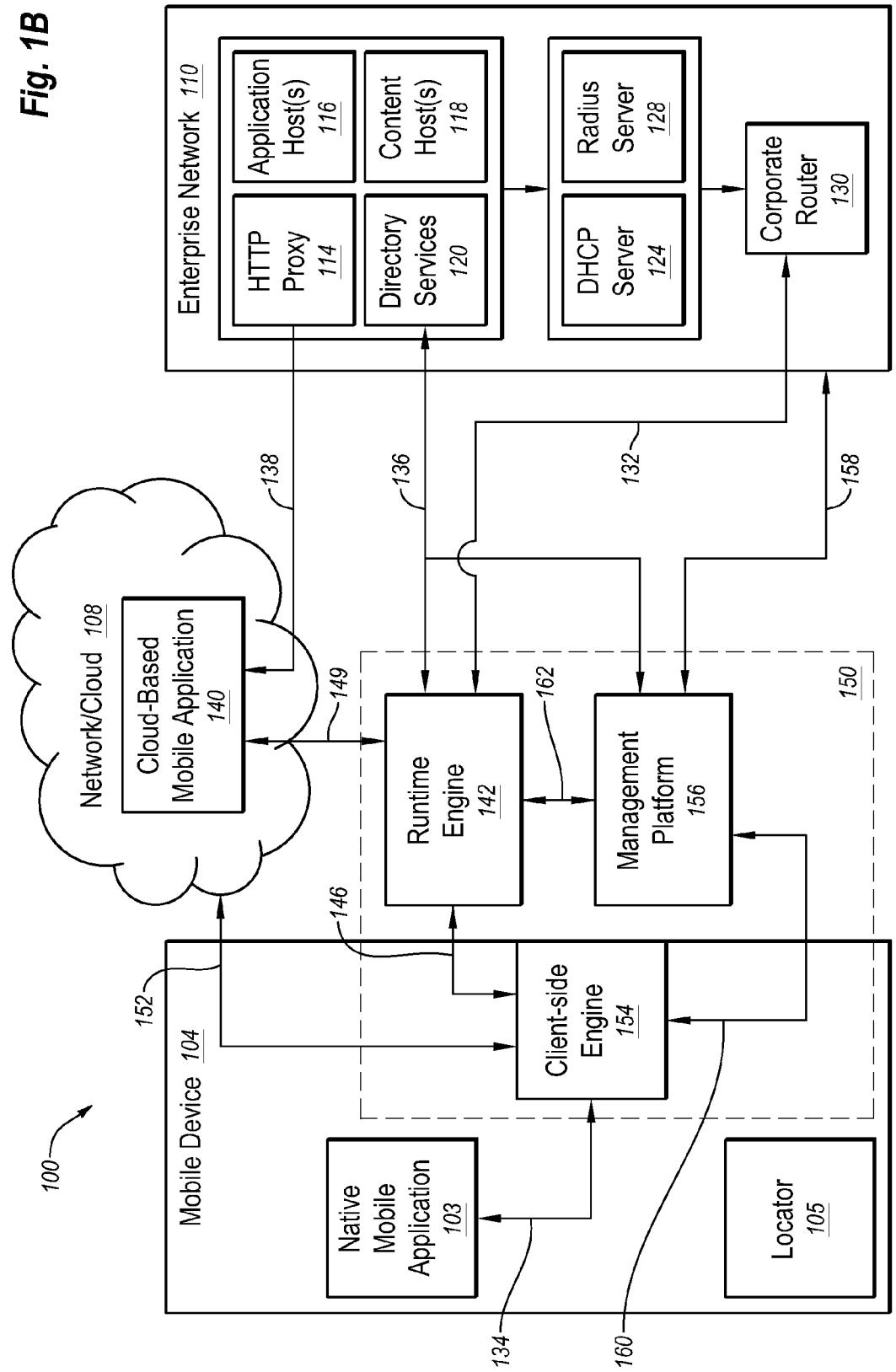
FIG. 1B is an example operating environment in which some embodiments described herein can be implemented.

Referring to FIG. 1B, an example operating environment 100 is illustrated in which some embodiments of a mobile application management system may be implemented. Generally, the operating environment 100 may be a BYOD environment. Accordingly, the operating environment 100 may include a mobile device 104 that may be provided and/or owned by one or more users (not shown), a public network and/or a cloud ("network/cloud") 108, and an enterprise network 110. A mobile application management policy enforcement engine (enforcement engine) 150 that may be included in the mobile application management system may also be included in the operating environment 100. The enforcement engine 150 may manage mobile applications on the mobile device 104, which are referred to herein as native mobile applications 103; mobile applications in the network/cloud 108, which are referred to herein as cloud-based mobile applications 140; communication of traffic related to mobile applications, either cloud-based mobile applications 140 or native mobile applications 102, within the operating environment 100; or some combination thereof. Example communications are indicated by arrows 152, 149, 136, 134, 132, and 146 in FIG. 1B.

The operating environment 100 may include the mobile device 104. Although one mobile device 104 is depicted in FIG. 1B, there may be multiple mobile devices 104 included in the operating environment 100. One or more users may be associated with the mobile device 104. The association between the one or more users and the mobile device 104 may indicate that the user owns, uses, has provided, or has responsibility for the mobile device 104, for example. A one-to-one association between the mobile device 104 and the user is not required. For example, the mobile device 104 may be associated with one user, multiple mobile devices 104 may be associated with one user, a mobile device 104 may be associated with multiple users, or some combination thereof. The mobile device 104 might include, but is not limited to, a mobile phone, a smartphone, a personal digital assistant, a laptop computer, a tablet computer, or other mobile communication device.

In some embodiments, the mobile device 104 may additionally include a locator 105. The locator 105 may track or otherwise calculate a real-time location of the mobile device 104. The locator 105 may include a global positioning system ("GPS") locator or a network-based locator that determines the location of the mobile device 104 based on access point proximities.

The mobile device 104 may have installed thereon the native mobile application 103. The native mobile application 103 may be downloaded from the network/cloud 108 such as through a mobile application store. An example of a native mobile application 103 may include a mobile application that is purchased from a publically accessible internet application store. When installed on the mobile device 104, the native mobile application 103 may be run without connecting to a network/cloud 108. The native mobile application 103 may be a private mobile application or a public mobile application. Generally, public mobile applications may include any publically available mobile applications. Private mobile applications may include mobile applications created by an enterprise (not shown) or mobile applications that have been privately licensed by the enterprise, for example.

The network/cloud 108 may include one or more local area networks (LANs) and/or wide area networks (WANs). In some embodiments, the network/cloud 108 includes the Internet, including a global internetwork formed by logical and physical connections between multiple WANs and/or LANs. Alternately or additionally, the network/cloud 108 may include one or more cellular RF networks and/or one or more wired and/or wireless networks such as, but not limited to, 802.xx networks, Bluetooth access points, wireless access points, IP-based networks, or the like. The network/cloud 108 may also include servers that enable one type of network to interface with another type of network.

The network/cloud 108 may include the cloud-based application 140 that is maintained and/or stored at least partially in the network/cloud 108. The cloud-based mobile application 140 may be accessed by the mobile device 104 through a browser, for instance. In this manner, the mobile device 104 may use and have reliable access to the cloud-based mobile application 140 without loading and/or storing the cloud-based mobile application 140 on the mobile device 104. The cloud-based mobile application 140 may include a public mobile application or a private mobile application. The cloud-based mobile application 140 may be updated and/or modified and may be accesses by other mobile devices 104.

Additionally or alternatively, the enterprise network 110 may communicate with the cloud-based mobile application 140 as indicated by a communication denoted at 138. A modification of the cloud-based mobile application 140 may occur via communication 138 when the cloud-based mobile application 140 is a private mobile application, for example. That is, the enterprise may be responsible for updates to the cloud-based mobile application 140 and may communicate the updates to the cloud-based mobile application 140.

As depicted in FIG. 1B, one network/cloud 108 includes one cloud-based mobile application 140, however this depiction is not meant to be limiting. The operating environment 100 may include multiple network/clouds 108 any one or more of which may include one or more cloud-based applications 140.

The operating environment 100 may include the enterprise network 110 employed by the enterprise. The enterprise network 110 may generally include one or more servers that enable the enterprise to internally communicate and/or to communicate with the mobile device 104, the network/cloud 108, the enforcement engine 150, or some combination thereof.

In this and other embodiments, internally, the enterprise network 110 may include an HTTP proxy 114, an application host 116, directory services 120, and a content host 118, which may communicate with a dynamic host configuration protocol ("DHCP") server 124 and/or a radius server 128. The DHCP server 124 and/or the radius server 128 may further communicate with a corporate router 130. One or more of the HTTP proxy 114, the application host 116, the directory services 120, the content host 118, the DHCP server 124, the radius server 128, and/or the corporate router 130 may additionally or alternatively communicate with the network/cloud 108, the enforcement engine 150, the mobile device 104, or some combination thereof. For example, the directory services 120 may communicate with the enforcement engine 150 via communication(s) denoted at 136 (discussed below).

In alternative embodiments, the enterprise network 110 may take various configurations including any combination of the components discussed above and/or one or more other components not explicitly listed.

As stated above, the enterprise network 110 may enable communication between the enterprise and the mobile device 104, the network/cloud 108, the enforcement engine 150, or some combination thereof. For example, the enterprise network 110 may enable the mobile device 104 to access private mobile applications that may be stored on the applications host 116 and/or the HTTP proxy server 114; the enforcement engine 150 to access personnel information that may be stored in the directory services 120; the enforcement engine 150 access through a corporate router 130, or some combination thereof.

As previously mentioned, the enforcement engine 150 may be a part of the mobile application management system. Generally, the enforcement engine 150 may be configured to, among other things, control and secure: mobile applications; the mobile device 104; and communications including traffic related to mobile applications between the mobile device 104, the network/cloud 108, and the enterprise network 110 within the operating environment 100. The enforcement engine 150 may be customized to the operating environment 100 through the generation of a policy. The policy may include specific controls and/or security features/protocols specific to the operating environment 100. For example, the enterprise may customize the specific control of the mobile device 104 in the operating environment 100 by selecting a set of mobile applications it deems inappropriate. Additionally or alternatively, the enterprise may enable the mobile device 104 to use a private mobile application by allowing access to the private mobile application or may allow the mobile device 104 to install the private mobile application on the mobile device.

With combined reference to FIGS. 1A and 1B, the policy may have a tree structure similar to that described with reference to FIG. 1A. The tree structure of the policy may be based on one of the substructures 170 of the corresponding enterprise customer 160. Accordingly, the policy may define controls and/or security features for one or more organizational units 160/164/166/168 according to the level within the substructure 170. For example, a "root organization control" may be the most general control which may apply to all organizational units 160/164/166/168 of a substructure 170. In contrast, a "user control" may be the most precise which may apply to a single user 168.

In some embodiments that include a policy with a tree structure, a policy evaluation process may start from a bottom organizational unit such as the users 168 in FIG. 1A and proceed to higher levels in the substructure 170. Specifically, referring to FIG. 1A, the second department 166B is at a higher level than the first user 168A, the second user 168B, and the third user 168C. In addition, the first business unit 164A is at a higher level than the first department 166A and the second department 166B in the first substructure 170A. This convention is used herein with respect to descriptions of "higher" and "lower" levels.

Thus, if the policy applies at the lowest level, the enforcement engine 150 applies the policy. However, if the policy does not apply at a lowest level, then the policy evaluation proceeds to the next higher level. Again, if the policy applies at the next higher level the enforcement engine 150 applies the policy. If not, the policy evaluation proceeds to the next-higher level. This evaluation progression continues until there are no more levels. In some embodiments, if the policy does not apply at any level, the policy treats the communication or request as a violation. In other embodiments, if the policy does not apply at any level, the policy treats the communication or request as allowable.

Referring again to FIG. 1B, the enforcement engine 150 may include a client-side enforcement engine (client-side engine) 154, a runtime enforcement engine (runtime engine) 142, and a management platform 156 that in some combination enforce compliance with the policy. Enforcement of the policy may occur in real time. That is, as the user is operating the mobile device 104, the enforcement engine 150 may be blocking one or more mobile applications, monitoring the users' access to cloud applications 140, etc. The client-side engine 154 may be installed and/or run on the mobile device 104 while the runtime engine 142 and/or the management platform 156 may be installed and/or run in the network/cloud 108 and/or the enterprise network 110.

The enforcement engine 150 may include one or more of each of the client-side engine 154 and/or the runtime engine 142. For example, in some embodiments, the enforcement engine 150 may include a device guard which may be implemented as the client-side engine 154. Additionally, the enforcement engine 150 may include a cloud solution and/or a mobile applications access control and security (MAACS engine). The runtime engine 142 may include the MAACS engine in some embodiments. Additionally or alternatively, the cloud solution may include the runtime engine 142, the client-side engine 154 or some combination thereof.

The client-side engine 154 may be downloaded and/or stored on the mobile device 104. The client-side engine 154 may control and/or secure the mobile device 104, the mobile applications that may include one or more native mobile applications 103, and/or one or more cloud applications 140 accessed by the mobile device 104, and/or communications entering and/or exiting the mobile device 104. For example, the client-side engine 154 may block the native mobile applications 103 on the mobile device 104; the client-side engine 154 may block access to the cloud-based mobile application 140 when access is attempted from the mobile device 104 through a browser, for instance; and/or the client-side engine 154 may coordinate with the runtime engine 142 of the enforcement engine 150 to maintain and/or moderate a tunnel connection with the enterprise network 110.

The runtime engine 142 of the enforcement engine 150 may be installed and/or run in the network/cloud 108 and/or the enterprise network 110. The runtime engine 142 generally includes and may communicate the policy that determines how the enforcement engine 150 will operate in the operating environment 100. Contents of the policy may be communicated throughout the operating environment 100 by the runtime engine 142. The runtime engine 142 may additionally or alternatively provide and/or control an interface between the network/cloud 108, the mobile device 154, and the enterprise network 110. Control of the interface between the network/cloud 108, the mobile device 154, and the enterprise network 110 may be based on the policy. An example of the function of the runtime engine 142 may include inspecting upstream mobile traffic in real time, identifying the originating mobile device 104 and/or user, and then enforcing the policy on the upstream mobile traffic.

The management platform 156 of the enforcement engine 150 may be installed and/or run in the network/cloud 108 and/or the enterprise network 110. The management platform 156 generally coordinates creation, modification, and enforcement of the policy. For example, the management platform 156 may enable the creation of the policy using input from the enterprise, an administrator, a public source, or some combination thereof.

Additionally, the management platform 156 may communicate with the enterprise network 110. In FIG. 1B, the communication between the management platform 156 and the enterprise network 110 is represented by arrow 158. Some examples of the communication between the management platform 156 and the enterprise network 110 may include, but is not limited to, receiving modifications to the policy from the enterprise network 110 and/or the administrator; transmitting violations, statistics, etc. to the enterprise network; and providing a user interface visible to the enterprise network 110.

Within the enforcement engine 150, the management platform 156 may communicate with the runtime engine 142 and the client-side engine 154 as indicated by arrows 160 and 162 in FIG. 1B. For example, the client-side engine 154 may periodically "call home" to the management platform 156 to pull policy updates and/or other application updates. The client-side engine 154 may also periodically notify the management platform 156 of status updates, access violations, pull commands from the management platform 156, or some combination thereof.

Additionally or alternatively, the runtime engine 142 may periodically receive policy updates, such as mobile application signature changes (discussed below) or substructure modifications (discussed with reference to FIG. 1A) from the management platform 156. Additionally or alternatively, the runtime engine 142 may periodically receive internet protocol (IP) address mappings of the mobile device 104. By updating the IP address of the mobile device 104, the runtime engine 142 may identify the mobile device 104. Additionally or alternatively, in some embodiments, the runtime engine 142 may track one or more logs. The logs may be communicated to the management platform 156 by the runtime engine 142. The logs may be further processed at the management platform 156 and/or communicated to the enterprise network 110. One or more of the communications within the enforcement engine 150 or between the management platform 156 and the enterprise network 110 may be event driven. Alternatively, the communications with the enforcement engine 150 or between the management platform 156 and the enterprise network may routinely occur.

Additionally or alternatively, the enforcement engine 150 may perform certification processes. Generally, the certification processes may include, but are not limited to, verification of a mobile device 104, appropriateness of a mobile application, and a source of a mobile application. The certification processes may include some combination of the client-side engine 154, the runtime engine 142, and the management platform 156 and communications therebetween. That is, the enforcement engine 150 may include both client-side and server-side certification.

The communications within the enforcement engine 150, that is, between the management platform 156, the client-side engine 154, and the runtime engine 142, as well as the communication between the enforcement engine 150 and the network enterprise 110 may occur using the same or different protocols. For example, in some embodiments, the communications within the enforcement engine 150 may include separate protocols for communication between the management platform 156 and the client-side engine 154 and communication between the management platform 156 and the runtime engine 142.

In this and other embodiments, the client-side engine 154 may communicate with the management platform 156 via a web services module (discussed below). The communication between the client-side engine 154 and the management platform 156 may adopt a proprietary communication protocol such as hypertext transfer protocol extensible markup language (HTTP-XML). Additionally, the protocols may include a collection of endpoints exposed by the management platform 156 for various mobile operating systems such as iOS. The collection of endpoints may exhibit the behavior as outlined in the profile of the mobile operating system.

The communication between the management platform 156 and the runtime engine 142 may vary based on what is being communicated. For example, for updates the management platform 156 and the runtime engine 142 may communicate via a persistent secure socket layer (SSL) connection. The updates discussed above may be pushed via the SSL connection. Additionally, between the management platform 156 and the runtime engine 142 there may be a keep-alive, ping—acknowledgement mechanism to ensure that the communication SSL connection is active. The management platform 156 may include a worker thread to service the SSL connection.

In contrast, the communication between the runtime engine 142 and the management platform 156 for logs may use a separate protocol. For example, the logs may be aggregated by a daemon process in the runtime engine 142 and periodically dispatched to the management platform 156. The logs may be compressed using various algorithms and transmitted over a standard protocol. For example, the logs may be compressed using the Lempel Ziv Markov chain algorithm and transmitted over hypertext transfer protocol secure (HTTPS).

For certification processes, the enforcement engine 150 may generally issue and revoke digital certificates for mobile devices 104 and or users associated therewith on a certificate authority database. The enforcement engine 150 may use an issuing protocol for the certification processes such as simple certificate enrollment protocol (SCEP).

The client-side engine 154 and the runtime engine 142 may manage one or more communications, denoted at 152, 149, 134, 136, 132, and 146, within the operating environment 100. The communications 152, 149, 134, 136, 132, and/or 146 may include traffic related to mobile applications. For example, in the operating environment 100, the client-side engine 154 may manage access by the mobile device 104 to cloud-based applications 140 that are public mobile applications, including managing communications 152 between the client-side engine 154 and the cloud-based applications 140. The management by the client-side engine 154 may be based on the policy. For example, if the policy blocks access to YouTube by the mobile device 104 because YouTube usage consumes excessive bandwidth for instance, the client-side engine 154 may block the mobile device 104 from accessing YouTube. Alternatively, if the policy allows access to YouTube, the mobile device 104 may access YouTube from the network/cloud 108.

Additionally or alternatively, in some embodiments the client-side engine 154 blocks the mobile device 104 from running and/or launching the native mobile application 103. Again, whether the client-side engine 154 blocks the native mobile application 103 may be based on whether the policy blocks the native mobile applications 103. For example, the native mobile application may be a game the enterprise has deemed to be malicious or potentially malicious. Accordingly, the client-side engine 154 may block the mobile device 104 from launching the game.

Additionally or alternatively, in some embodiments the mobile device 104 may communicate with the enterprise network 110 via a virtual private network ("VPN") tunnel. For example, the VPN tunnel may allow the mobile device 104 to access data stored on the enterprise network 110. In these and other embodiments, the client-side engine 154 may assist in managing the communication between the mobile device 104 and the enterprise network 110 via the VPN tunnel. As indicated by arrow 146, the client-side engine 154 may route communications via the VPN tunnel through the runtime engine 142. The runtime engine 142 may then route the communications to the corporate router 130 as indicated by arrow 132, thus establishing a VPN tunnel between the mobile device 104 and the enterprise network 110.

The management of the VPN tunnel may be based on the policy. For example, the policy may restrict communication via the VPN tunnel unless a secure wireless ("WiFi") network is available and/or a specific VPN conductivity is available. Alternatively, the policy may allow communication via the VPN tunnel via a public radio network. The runtime engine 142 and/or the client-side engine 154 may accordingly block the VPN tunnel without the secure WiFi network and/or the specific VPN conductivity. Alternatively, the runtime engine 142 and/or the client-side engine 154 may accordingly allow communication via the VPN tunnel via the public radio network.

Additionally or alternatively, the runtime engine 142 and/or the client-side engine 154 may prohibit access to one or more mobile applications when a VPN connection is not established. In some embodiments, the client-side engine 154 may then take the user of the mobile device to a VPN configuration screen, thereby enabling the user to establish the VPN connection.

Additionally, in some embodiments, the enforcement engine 150 may include generic routing encapsulation ("GRE") technology applied to communications between the mobile device 104 and the enterprise network 110. By applying the GRE technology to the communication, a GRE tunnel may be generated in which packets of information included in the communication are not parsed or treated like IP packets by any intervening routers.

Additionally or alternatively, the runtime engine 142 and/or the management platform 156 may communicate with the enterprise network 110 as indicated by arrow 136. Specifically, in some embodiments, the runtime engine 142 may access directory information that may be stored in the directory services 120. According to some policies, the mobile device 104 may not be allowed access to the cloud-based mobile application 140 and/or the VPN tunnel without verification of the user associated with the mobile device 104. In these and other embodiments, the runtime engine 142 may use the directory information to determine and/or verify the user associated with the mobile device 104.

Additionally, the directory information may be communicated from the directory services 120 to the runtime engine 142 then to the cloud-based mobile application 140 as indicated by arrow 149. The directory information may modify the cloud-based mobile application 140. Once configured, the management platform 156 may periodically check the "alive" status of the directory information by communicating updated directory information. The communications between the runtime engine 142 and/or management platform 156 and directory services 120 may use a standard lightweight directory access protocol (LDAP).

The above listed functions of the enforcement engine 150 are illustrative and are not intended to be limiting. The enforcement engine 150 may perform additional or alternative functions. For instance, the enforcement engine 150 may be configured to provide a four-way mapping between users, mobile devices 104, mobile applications—both native mobile applications 103 and/or cloud-based applications 140, enterprise data, mobile device data, access times, or some combination thereof such that the enterprise can have visibility into which user using a particular mobile device 104 accessed a particular mobile application and during which periods of time.

Alternately or additionally, the enforcement engine 150 may be configured to provide visibility into which users on which mobile devices 104 accessed which mobile applications, enterprise data, mobile device data, or some combination thereof in the network/cloud 108. Alternately or additionally, the enforcement engine 150 may be configured to generate event-based alerts when policy violations occur. For example, an event may include the user accessing a mobile application that was not permitted as defined in a blacklist In addition, if a particular mobile device 104 is misplaced or lost, the enforcement engine 150 may be configured to allow the enterprise to disable a mobile application on the particular mobile device 104 for a particular user, while continuing to allow the user to operate normally from another mobile device, and/or to lock or wipe the particular mobile device 104 completely.

Figure 2:
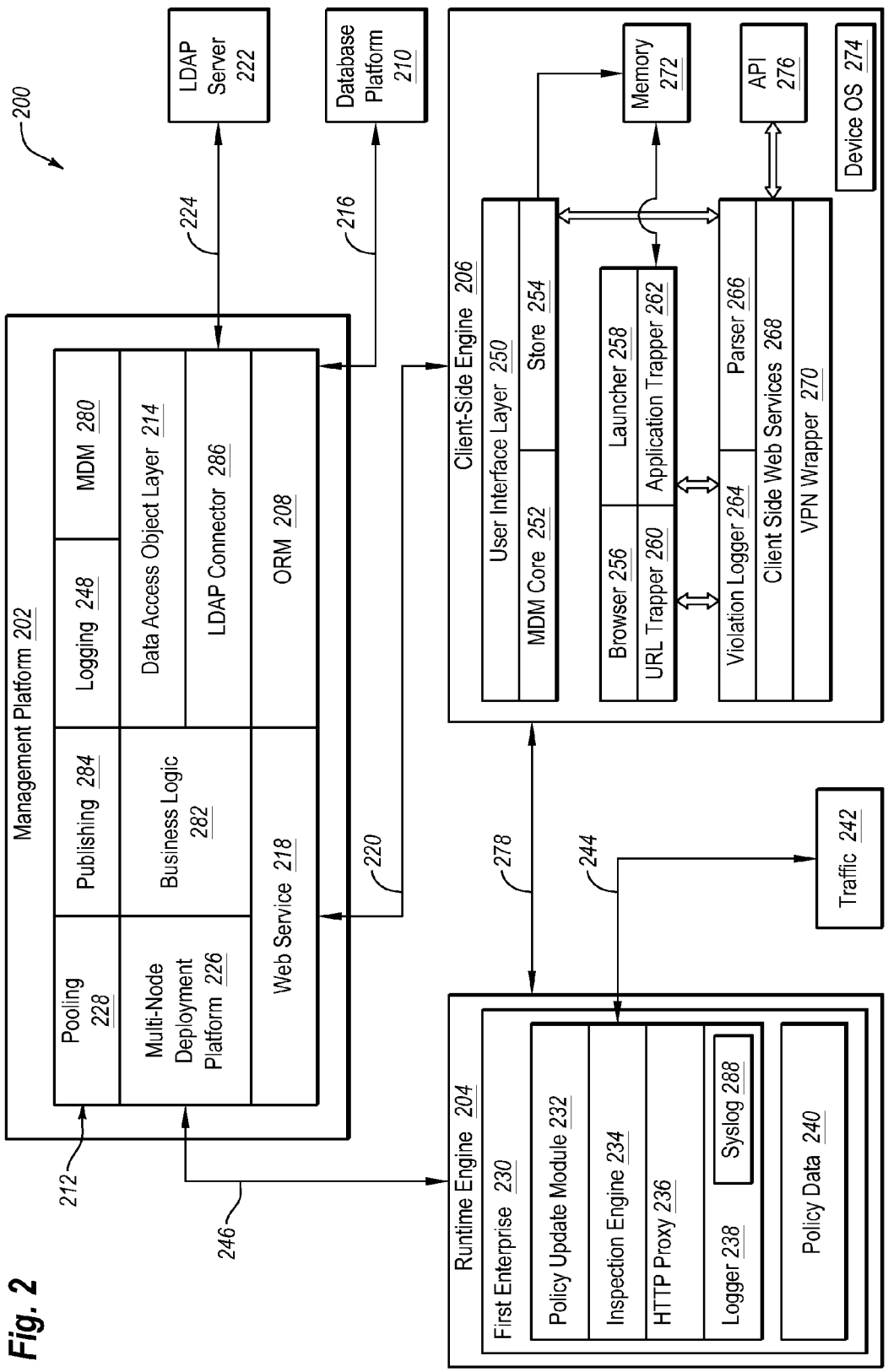
FIG. 2 illustrates an example system architecture for an example enforcement engine that may be implemented in the operating environment of FIG. 1B.

FIG. 2 illustrates an example system architecture (system architecture) 200 for an enforcement engine that may be implemented in the operating environment 100 of FIG. 1B. For example, the system architecture 200 may correspond to the enforcement engine 150 of FIG. 1B. Generally, the system architecture 200 includes a management platform 202, a runtime engine 204, and a client-side engine 206 that may respectively correspond to the management platform 156, the runtime engine 142, and the client-side engine 154 of FIG. 1B. The embodiment of FIG. 2 illustrates a system architecture 200 that enforces a policy of a first enterprise 230. However, in alternative embodiments, the management platform 202 may be a multitenant management platform enforcing policies for any number of enterprises.

The management platform 202 may enable an administrator to perform tasks related to the enforcement of policies. For example, the management platform 202 may enable the administrator to define policies, monitor devices for compliance with policies, view reports including information related to enforcement of policies, and view alerts related to the policies. Additionally, the management platform 202 may track the operational status of devices, and publish or push policies to the devices and to the real-time engine 204, for example.

The management platform 202 includes one or more modules 228, 284, 248, 280, 226, 282, 214, 286, 218, and/or 208 in an application stack 212 which may enable the performance of the above tasks, among others. In some embodiments, the enterprise stack 212 may include a Java Platform, Enterprise Edition (J2EE) application stack, which may be based on a Spring framework.

The application stack 212 may include one or more modules 228, 284, 248, 280, 226, 282, 214, 286, 218, and 208 that may enable database access between the management platform 202 and a backend database platform (database platform) 210 and/or an LDAP server 222. The database access between the database platform 210 and the management platform 202 is represented in FIG. 2 by arrow 216. Likewise, the database access between the LDAP server 222 and the management platform 202 is represented by arrow 224.

The database accesses 216 and 224 between database platform 210 and the management platform 202 and /or the LDAP server 222 and the management platform 202 may be conducted through an object relational mapping ("ORM") module 208 ("ORM" in FIG. 2), a data access object layer 214, an LDAP connector 286, or some combination thereof. In some embodiments, the ORM module 208 may include Hibernate framework, for instance.

The management platform 202 may also include a web services module (web services) 218. The web services 218 may enable communication between the management platform 202 and the client-side engine 206 and/or a mobile device (not shown) implementing the client-side engine 206. The communication between the client-side engine 206 and the management platform 202 is represented by arrow 220. In some embodiments, the web services 218 may be implemented using a java architecture for XML binding (JAXB) based data-binding. Additionally, in some embodiments, the management platform 202 may scale the web services 218 by including a multi-node deployment platform 226 such as a multi-node deployment J2EE with session clustering, for example.

In some embodiments, the application stack 212 may include an additional layer of security and/or a load balancing application. For example, J2EE application servers may include an application or server that runs one or more standalone daemon process such as an apache Hypertext Transfer Protocol daemon (HTTPd) server.

Additionally, the application stack 212 may include a logging module 248 ("logging" in FIG. 2), connection pooling module 228 ("pooling" in FIG. 2), a business logic module 282 ("business logic" in FIG. 2), a publishing module 284 ("publishing" in FIG. 2), and a mobile device management module (MDM) module 280 ("MDM" in FIG. 2), or some combination thereof. The logging module 248 may receive, log, store, or some combination thereof, one or more logs communicated from the runtime engine 204 or the client-side engine 206. For example, the runtime engine 204 may transmit logs to the management platform 202, which may be stored in the logging module 248. The communication between the management platform 202 and the runtime engine 204 is represented in FIG. 2 by arrow 246.

The pooling module 228 may centrally store information related to the policy, the enterprise, etc. The publishing module 284 controls and communicates updates to the runtime engine 204, the client-side engine 206, an enterprise network (not shown), or some combination thereof. The business logic module 282 may include one or more details of the enterprise. The MDM module 280 includes the details of the policy.

The management platform 202 depicted in FIG. 2 is not meant to be limiting. In alternative embodiments, the management platforms may include one or more alternative modules that perform for example background jobs or the localization. In this and other embodiments the modules 228, 284, 248, 280, 226, 282, 214, 286, 218, and 208 and applications included therein may be performed by standard applications such as Spring component beans.

The runtime engine 204 may include multiple modules 232, 234, 236, 238, and 240 that may perform runtime and/or real time enforcement of the policy, enable updating of the policy, log violations of the policy, communicate logs to the management platform 202, or some combination thereof. Generally, the modules 232, 234, 236 and 238 may include daemons that may be run on system boot and/or may run continuously.

An inspection engine module (inspection engine) 234 may be included in the runtime engine 204 to monitor internet traffic (traffic) 242. The monitoring of the traffic 242 is represented in FIG. 2 by arrow 244. Specifically, in some embodiments, the inspection engine 234 may be installed and included in a host (not shown). The host may be configured to direct the traffic 242 to the inspection engine 234. For example, in some embodiments the inspection engine includes a listening socket that receives the traffic 242 transmitted from the host. The inspection engine 234 may be aware of data included in a third layer (the IP layer) and a fourth layer (the transmission control protocol (TCP) layer). When inspection engine 234 intercepts the traffic 242, the inspection engine 234 may view a source IP address of the traffic 242, a destination IP addresses of the traffic 242, an original destination IP address, an original TCP port, or some combination thereof.

For example, the inspection engine 234 may be running on a host with an IP address of 1.2.3.4. Additionally, the inspection engine 234 may be listening on a 10000 TCP port. A user of a mobile device with an IP address of 192.168.0.1 is attempting to access, with a request, a public website with an IP address of 10.20.30.40. The request originates at 192.168.0.1:1051 and is directed to 10.20.30.40:443. The request is routed through the host. Even though the request is directed to host 1.2.3.4 to TCP port 443, it is internally redirected to the listening socket of the inspection engine 234, that is, IP address 1.2.3.4, TCP port 10000. The inspection engine 234 may receive the request on the listening socket. The inspection engine 234 may not be able to decrypt the SSL stream of the request. Thus, the inspection engine 234 may not be able to determine an original destination. However, the inspection engine 234 is able to see the original IP address i.e., 10.20.30.40 and original TCP port i.e., 443. Based on the original IP address and the original TCP port, the policy is applied, determining whether the traffic 242 is allowed or not. If the traffic 242 is not allowed, the connection is closed. If the traffic 242 is allowed, the runtime engine 204 establishes a new connection to the original IP address and original TCP address. Additionally, if the new connection is established, the runtime engine 204 allows traffic 242 until the new connection is closed.

In some embodiments, the traffic 242 includes HTTP traffic and/or HTTPS traffic. For HTTP traffic and HTTPS traffic for which certificates and private keys are provided to runtime engine 204, the HTTP traffic or HTTPS traffic is inspected at HTTP level, instead of TCP level. Additionally, each request included in the HTTP traffic or the HTTPS traffic may be considered separately against the policy. If a particular request included in the HTTP traffic or HTTPS traffic is allowed, the data is relayed to a separate connection between the runtime engine 204 and an original service server.

The inspection engine 234 runs as a daemon. Specifically, the inspection engine 234 may run several threads to handle HTTP connections and/or HTTPS connections. The threads may be referred to as work threads. The work threads may include a master thread that receives incoming connections. The master thread then determines which of the work threads is least busy and transfers the connection over to the least busy thread. If all of the work threads are busy, the master thread transfers the connection to the first work thread on a work thread list. Work threads may handle multiple connections simultaneously using an event system processed in each work thread's event loop. The number of Work Threads is configurable. In some embodiments, a default number of work threads may be 4 in some embodiments. Additionally or alternatively, some embodiments include a policy update thread for handling connections related to a policy update module 232.

The runtime engine 204 may include the policy update module 232 to monitor the management platform 202 for policy updates. In some embodiments, the policy update module 232 may be configurable in a passive mode and/or an active mode. In passive mode, the policy update module 232 periodically checks if an updated version of the policy is available on the management platform 202. A time interval between checks may be configurable. In active mode, the policy update module 232 establishes persistent connection to the management platform 202 and awaits the management platform to push policy updates. Whenever the connection is dropped, the policy update module 232 persistently tries to re-establish the connection. In some embodiment, a proprietary protocol is used to communicate policy updates.

The runtime engine 204 may include a logger module (logger) 238. A function of the logger 238 may include accumulating information and sending logs to the management platform 202. The logger 238 may not directly contact the inspection engine 234 to obtain logs. Instead, the logger 238 may include the syslog 288 that may be used to distribute the logs between the logger 238 and the inspection engine 234. In some embodiments with multiple networks, the syslog 288 may be able to send logs to another host running a second syslog (not shown). The communication between the syslog 288 and the second syslog may enable a host running the syslog 288 and the logger 238 to gather logs from multiple hosts. The communication between the syslog 288 and the second syslog may be applicable when an enforcement engine, such as the enforcement engine 150 of FIG. 1B, is utilizing web load-balancing, for instance.

In some embodiments, the logs communicated from the logger 238 to the management platform 202 may be sent over HTTPS protocol. Authentication of the logs may occur at one or more data levels including, but not limited to, the HTTP level or the SSL level.

The runtime engine 204 may include policy data 240, a proxy 236 ("HTTP Proxy" in FIG. 2), and a watcher (not shown). The policy data 240 contains a set of rules used for defining access to services and applications. The policy data 240 may reflect the structure of the policy, such as a tree structure. The policy data 240 may be updated by the management platform 202. Additionally, the proxy 236 acts as an intermediary for the traffic 242 and requests included therein. The watcher monitors operation of the runtime engine 204 and starts any component thereof if the component is not operational.

In some embodiments, the runtime engine 204 may include load-balancing capability. Runtime engines 204 utilizing a load-balancing capability may include a first host running an inspection engine 234 which is changed to a set of hosts. Each of the set of hosts runs an inspection engine 234. A runtime engine 204 utilizing a load-balancing capability may also include one policy update module 232. The one policy update module 232 monitors the management platform 202 updates. When the updates are received, the updates are pushed to the set of hosts.

The client-side engine 206 may include multiple modules 250, 252, 254, 256, 258, 260, 262, 264, 266, 268, 270, 272, 276, and 270 (generally, client-side modules 250-270). Generally, the client-side modules 250-270 enable the client-side engine 206 to locally enforce the policy at a mobile device implementing the client-side engine 206; periodically "call home" to the management platform 202 to pull policy updates and/or other application updates; track violations, which may be pushed to the management platform 202 for further processing; some combination thereof; or one or more functions.

Specifically, the client-side engine 206 may include a user interface layer (UI layer) 250. The UI layer 250 enables a user of the mobile device to view, manage, and modify the mobile device. For example, the user may attempt to purchase a mobile application from an application/contents store (store) 254 using the UI layer 250. Generally, at least some portion of input from the user of the mobile device is introduced to the mobile device through the UI layer 250.

A mobile device management core (MDM core) 252 enables the management platform to implement certain device controls that may be included in the policy. For example, MDM core 252 may enable the MDM 280 included in the management platform 202 to wipe or lock the mobile device. The MDM core 252 may interface with multiple systems of the mobile device operating system (device OS) 274 for example to enable the device controls.

The store 254 may interface with an application/content parser (parser) 266. The parser 266 generally reviews, evaluates, or performs analysis of the format of mobile applications or logs. For example, the parser 266 may evaluate the format of mobile applications available at the store 254. In some embodiments, the parser 266 may interface with an application programming interface (API) 276 that may act as a format for mobile applications for use with the device OS 274.

The client-side engine 206 may also include a memory 272. The memory 272 may store the policy, mobile applications, etc. The memory 272 may interface with the store 254 to save mobile applications purchased or otherwise obtained through the store 254, for instance. Additionally, updates related to the policy enforced by the client-side engine 206 may be saved and periodically updated in the memory 272.

A browser 256 and an application launcher (launcher) 258 may be included in the client-side engine 206. The browser 256 and the launcher 258 may enable the mobile device to launch a mobile application either locally, via the launcher 258, or over a network/cloud—via the browser 256. A uniform resource locator trapper (URL trapper) 260 enforces the policy to prohibit the launch of a mobile application via the browser 256. In addition, an application trapper (app trapper) 262 enforces the policy to prohibit the launch of a mobile application locally from the launcher 258. When a mobile application is prohibited from launching, a violation may be communicated to a violation logger 264. A web services module (client-side web service) 268 may communicate the violations to the management platform 202.

Additionally, the client-side engine 206 may include a virtual private network wrapper (VPN wrapper) 270. Generally, the client-side engine 206 along with the runtime engine 204 may cooperate to establish and control a VPN between the mobile device and an enterprise. The VPN between the mobile device and the enterprise may be communicated through the runtime engine 204 to enable the user of the mobile device to access enterprise mobile applications, for example. The communication between the client-side engine 206 and the runtime engine 204 is represented in FIG. 2 by arrow 278.

Figure 3A:
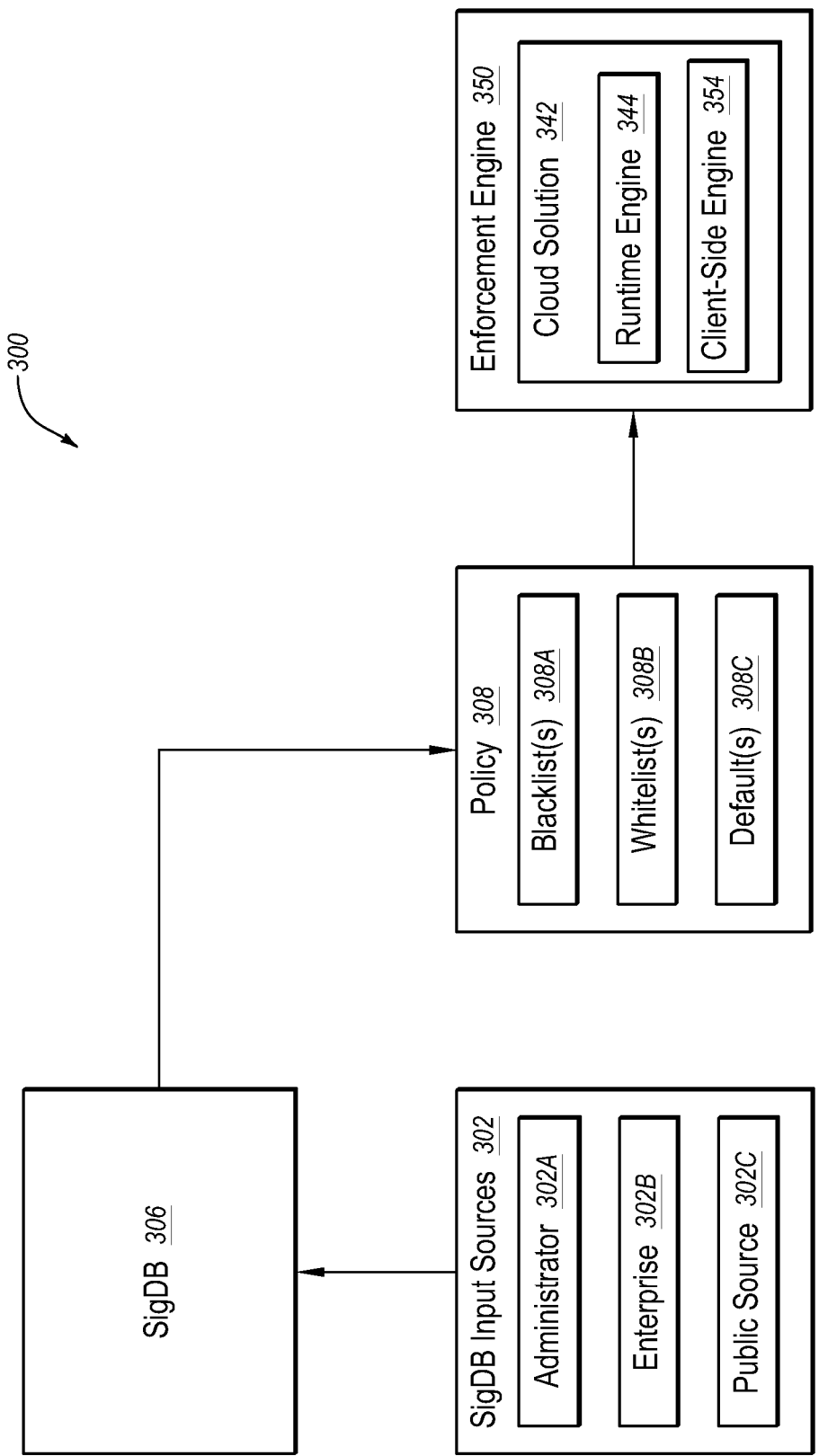
FIG. 3A is a block diagram of an example mobile application management system that may be implemented in the operating environment of FIG. 1B.

FIG. 3A illustrates a block diagram of an example mobile application management system 300 that may be implemented in the operating environment 100 of FIG. 1B. Generally, the management system 300 includes a SigDB 306. The SigDB 306 may include a set of signatures pertaining to one or more mobile applications. The signatures may include, for example, information indicating whether the mobile application is a public mobile application or a private mobile application, whether the mobile application is a native mobile application or a cloud-based mobile application, and information about vulnerabilities posed to the enterprise by the mobile application. The SigDB 306 may be visible to an enterprise 302B, thereby allowing the enterprise 302B to generate a policy 308 that may be custom to an operating environment, for instance. The policy 308 may be enforced or otherwise implemented within the operating environment by an enforcement engine 350 which may correspond to the enforcement engine 150 of FIG. 1B, for example.

The signatures may generally describe characteristics of mobile applications. The signatures of the SigDB 306 may be defined and/or published by one or more SigDB input sources 302. The SigDB input sources 302 may include, but are not limited to, an administrator 302A, the enterprise 302B, and a public source 302C. The administrator 302A may include the provider and/or administrator of the management system 300 such as the super administrator 158 and/or reseller administrator 162A of FIG. 1A. The public source 302C may include a network or an internet-based service that provides information concerning the vulnerabilities of mobile applications; examples of such services include, but are not limited to, SURBL and SPAMHAUS.

An example of a formation of the SigDB 306 may include the administrator 302A publishing signatures for one or more public mobile applications. In some embodiments, the signatures published by the administrator 302A may form the bases of multiple SigDBs 306. The signatures published by the administrator 302A may be described as pre-populated signatures because the signatures published by the administrator 302A may exist in the SigDB 306 before the enterprise 302B and/or public sources 302C publish signatures.

Additionally, the enterprise 302B may publish signatures for private mobile applications and/or sort, modify, etc. the signatures published by the administrator 302A. The signatures published by the enterprise 302B may be described as enterprise-definable signatures because generally the enterprise 302B may provide and control these signatures. The public source 302C may periodically update the signatures published by the administrator 302A and/or the enterprise 302B. The signatures published by public sources 302C may include threat data feeds. In this way, the SigDB 306 may be initially created then updated such that the signatures of the mobile applications are up-to-date and accurate.

Referring to FIG. 3B, an example SigDB 306 is illustrated that may be implemented in the mobile application management system 300 of FIG. 3A. The SigDB 306 may include one or more signature criteria 312A-312U (generally signature criteria or signature criterion 312) specified for one or more mobile applications 314A, 314B, and 314C (generally, mobile application(s) 314). In the SigDB 306, the mobile applications 314 include a first mobile application 314A, a second mobile application 314B, and an nth mobile application 314C. The "nth" indicates that information about any number of mobile applications 314 may be included in the SigDB 306.

The signature criteria 312 may include, but are not limited to: a mobile application name 312A that may be human-readable; a mobile application description 312B that may be human-readable; a mobile application unique identifier 312C; a mobile application version number 312D, a mobile application tag 312E that may include multiple commas that separate tags of the mobile application; a public vs. private flag 312F; a cloud-based vs. native flag 312G; a mobile application download uniform resource locator ("URL") 312H that may be the URL at which the mobile application may be downloaded and/or purchased; a mobile application risk 312I that may be designated as a value such as a number 1-5, 1 being the least risk and 5 being the greatest risk; a mobile application characteristic 312J which may include designations such as "evasive," "excessive bandwidth," "prone to misuse," "transfers files," "tunnels other apps," "used by malware," or some combination thereof; a list of vulnerabilities of a mobile application 312K which may be designated by "spams the network" or "scans the network" or the like; a URL reputation 312L; an internet protocol ("IP") address reputation 312M; a mobile application access URLs 312N which may include the URLs of traffic generated by the mobile application; a HTTP URL traffic generated by a mobile application 312O; an IP address for accessing the HTTP sites 312P; a target platform 312Q that may be an operating system ("OS") name and/or OS version; a mobile application binary code 312R; a mobile application traffic URL 312S; a mobile application type 312T; and a mobile application category 312U that may include whether the mobile application is a utility, a game, a human resource application, a finance application, or an operational application, for instance.

In the SigDB 306, the signature for each mobile application 314 may include a specified value for each of the signature criteria 312. That is, in the depicted and other embodiments, the first mobile application 314A, the second mobile application 314B, and the nth mobile application 314C may include specified values for each of the signature criteria 312. As mentioned above, the specified values may include a number 1-5 indicating risk level or a designation such as "public," for instance.

Referring back to FIG. 3A, the SigDB 306 may be viewable to the enterprise 302B and/or the administrator 302A such that the enterprise 302B may generate the policy 308 based on the signatures included in the SigDB 306. The SigDB 306 may enable the enterprise 302B and/or the administrator 302A to sort and/or organize the signatures pertaining to the mobile applications in order to classify or characterize one or more mobile applications by common signature criteria that may be referred to as "commonalities." When organized in such a manner, the policy 308 or a part thereof may be based on one or more commonalities, and may be applied to all mobile applications including the commonality. As used herein, applying the policy 308 or a part thereof based on one or more commonalities may be referred to as "leveraging" the SigDB 306. As an example of leveraging, the enterprise 302B may restrict all mobile applications with a mobile application risk level of 3 or greater. That is, the administrator 302A may select a set of mobile applications available and organized in the SigDB 306 rather than manually publishing a signature for each mobile application.

More generally, the policy 308 may include one or more provisions applied to one or more mobile applications. The policy 308 may be customizable to a given operating environment. For example, the provisions may apply to (1) a specific mobile application, (2) a subset of mobile applications based on a commonality or lack thereof in the signatures of the mobile applications, (3) a user or set of users, (4) a type of mobile device, (5) a specific geographical area, which may be based on a locator, (6) a particular time, (7) one or more specific vulnerabilities, or some combination thereof.

Additionally, the policy 308 may include multiple variations of any of the provisions included above. For example, the policy 308 may include provisions that enable a first user to use a first private mobile application. Additionally, the policy 308 may enable a second user to use a second private mobile application. The first user and/or the second user may include individuals, an enterprise group, or the enterprise.

In some embodiments, the policy 308 may include a blacklist 308A, a whitelist 308B, and defaults 308C. The defaults 308C include automatic provisions based on the signatures of mobile applications. The blacklists 308A include a list of mobile applications that are blocked. The whitelists 308B include a list of mobile applications that are provisioned for use.

The policy 308 may be enforced by the enforcement engine 350, which may correspond to the enforcement engine 150 of FIG. 1B. Similar to the operating environment 100 of FIG. 1B, the enforcement engine 350 may include runtime engines and client-side engines. In the depicted and other embodiments, the enforcement engine 350 includes client-side engine 354. Additionally, enforcement engine 350 includes a runtime engine 344. In some embodiments, the enforcement engine 350 may also include a cloud solution 342. The cloud solution 342 may utilize the runtime engine 344, the client-side engine 354, or some combination thereof. Some additional details of the cloud solution 342 are discussed with reference to FIG. 4.

The client-side engine 354 and the runtime engine 344 may respectively correspond to the client-side engine 206 and the runtime engine 204 of FIG. 2, for example. As such, some details of the client-side engine 354 and the runtime engine 344 are disclosed herein with respect to FIG. 2.

Figure 4:
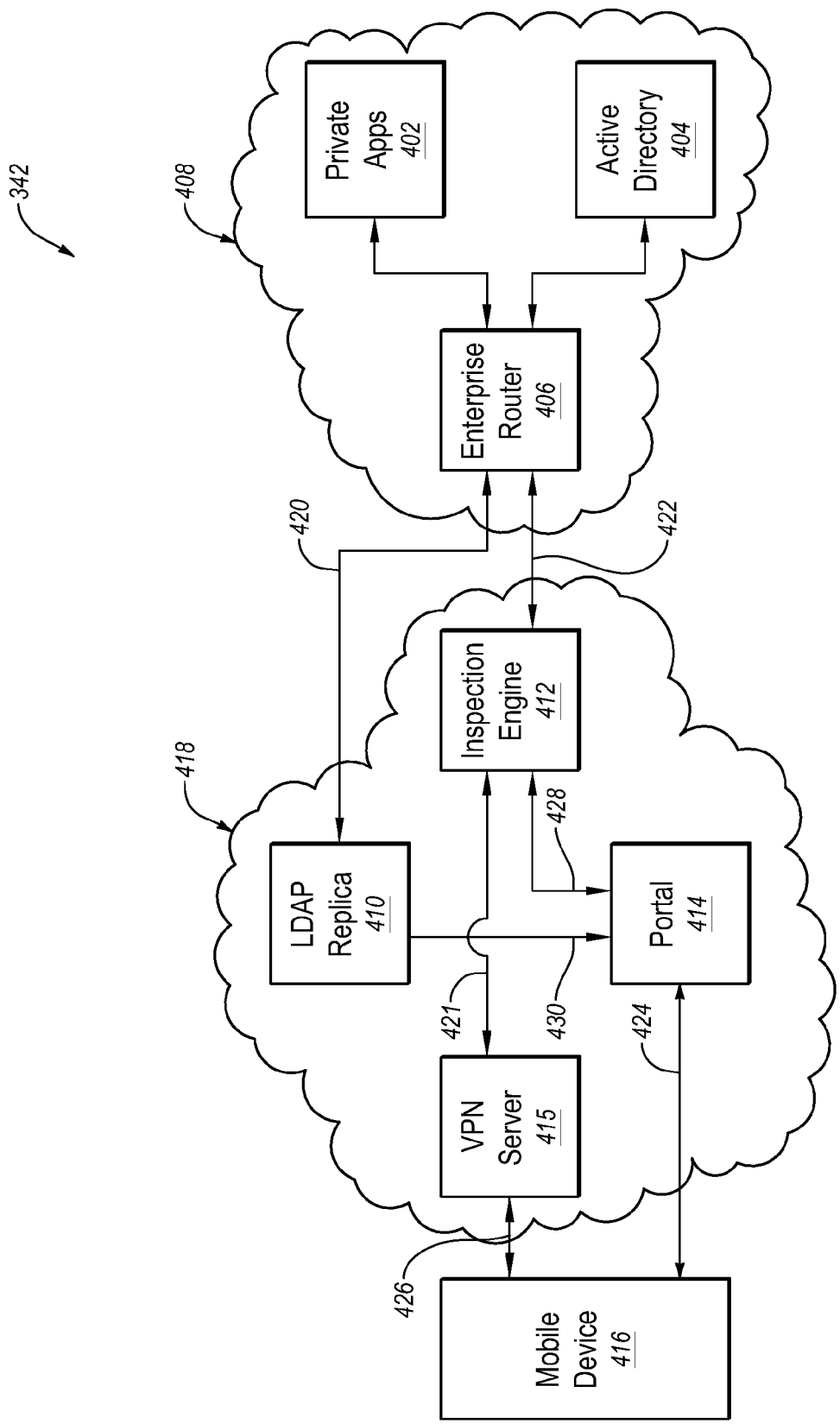
FIG. 4 is a block diagram of an example cloud solution that may be implemented in the mobile application management system of FIG. 3A.

Referring to FIG. 4, an example cloud solution 342 is illustrated that may be implemented in the mobile application management system 300 of FIG. 3A. The cloud solution 342 generally includes a mobile device 416, a runtime engine 418, and an enterprise network 408. The enterprise network 408 includes an active directory 404 and private mobile applications (private apps) 402 that may be communicated to the runtime engine 418 via an enterprise router 406. The enterprise router 406 may communicate with an LDAP replica 410 via a permanent site-to-site VPN tunnel. In some embodiments, the permanent site-to-site VPN tunnel includes an SSL VPN connection. The VPN permanent connection is represented by arrow 420 in FIG. 4. The LDAP replica 410 may communicate the private apps 402 and/or information in the active directory 404 to a portal 414 which may relay the private apps 402 and/or information in the active directory 404 to the inspection engine 412. The communication between the portal 414 and the LDAP replica 410 is represented by arrow 430 in FIG. 4 Likewise, the communication between the portal 414 and the inspection 412 is represented by arrow 428 in FIG. 4. Additionally, the portal 414 may communicate with a client-side engine on the mobile device 416. The communication between the portal 414 and the mobile device 416 is represented by arrow 424 in FIG. 4.

Policy updates and private apps updates may be pushed from the portal 414 to the mobile device 416. Through having the LDAP replica 410 updating the policy, the runtime engine 418 may update the policy on the mobile device 416.

Additionally, the cloud solution 342 enables formation of a VPN tunnel between the mobile device 416 and the enterprise router 406. The VPN may be requested by a user of the mobile device 416, for instance. Between a VPN server 415, which may receive the request from the mobile device 416, and the inspection engine 412 may be a permanent VPN tunnel, which is represented by arrow 421 in FIG. 4. Additionally, between the inspection engine 412 and the enterprise router 406 may be a permanent VPN tunnel, which is represented by arrow 422. Thus, the VPN server 415 may initiate and/or terminate the VPN between the mobile device 416 and the enterprise router 406. Through the VPN tunnel, the mobile device 416 may have access to the private apps 402 through the enterprise router 406.

Referring to FIG. 5, an example policy 308 organized as a 2×2 matrix is illustrated. The 2×2 matrix includes 2 columns and 2 rows creating 4 blocks 540, 542, 544, and 546. The policy 308 may be based on whether a mobile application is a native mobile application 532 or a cloud-based mobile application 534. This categorization designates the two rows. Additionally, the policy 308 is based on whether the mobile application is a private mobile application 538 or a public mobile application 536. This categorization designates the two columns. Whether a mobile application is a private mobile application 538 or a public mobile application 536 and whether the mobile application is a native mobile application 532 or a cloud-based mobile application 534 may be included in a SigDB such as the SigDB of FIGS. 3A and 3B.

A first block 540 describes a portion of the policy 308 applied to mobile applications that are both public mobile applications 536 and native mobile applications 532. A second block 542 describes a portion of the policy 308 applied to mobile applications that are both private mobile applications 538 and native mobile applications 532. A third block 544 describes a portion of the policy 308 applied to mobile applications that are both public mobile applications 536 and cloud-based mobile applications 534. A fourth block 546 describes a portion of the policy 308 applied to mobile applications that are both private mobile applications 538 and cloud based applications 534.

Each block 540, 542, 544, and 546 in the 2×2 matrix organizing the policy 308 includes a default rule and an enforcement strategy. The default rule may be based on whether the mobile application is a public mobile application 536 or a private mobile application 538 and the enforcement strategy is based on whether the mobile application is a native mobile application 532 or a cloud-based mobile application 534. Specifically, in this and other embodiments, if the mobile application is a public mobile application 536, the policy 308 includes a default rule for allowing the mobile application except for mobile applications that are blocked, i.e., mobile applications that are included on a blacklist By allowing the non-blacklisted mobile application, a user of a mobile device may use the mobile application locally on a mobile device and/or have access to the mobile application via a network/cloud. Essentially, the policy 308 generally allows use of public mobile applications 536 unless the enterprise deems or otherwise determines a public mobile application 536 to be undesirable. An example of a blacklisted mobile application may include pornographic applications.

Additionally, in this and other embodiments, if a mobile application is a private mobile application 538, the policy 308 includes a default rule to block the mobile application except for provisioned applications. That is, the mobile applications are placed on a whitelist. By blocking private mobile applications, the policy 308 generally blocks a user from using a mobile application locally at a mobile device and/or prohibits access by the user via a network/cloud.

The enforcement strategy of the policy 308 can be based on whether the mobile application is a native mobile application 532 or a cloud-based mobile application 534. As above, the policy 308 may be enforced by an enforcement engine that may include a client-side engine and a runtime engine. For example, the policy 308 may be enforced by the enforcement engine 350 of FIGS. 3A.

Generally, for mobile applications blocked by the policy 308, the client-side engine blocks the mobile application when launched on the mobile device, drops communications including traffic related to the mobile application, prevents a user from accessing a mobile application, or some combination thereof. Similarly, the runtime engine drops mobile application traffic related to mobile applications blocked by the policy 308.

Specifically, for mobile applications described by the first block 540, the client-side engine blocks mobile applications included on the blacklist when launched. Additionally, the runtime engine drops traffic for mobile applications included on the blacklist For mobile applications described by the second block 542, the client-side engine blocks all private mobile applications 538 except the mobile applications included on the whitelist. Additionally, the runtime engine drops traffic related to private mobile applications 538 except traffic related to mobile applications included on the whitelist. For mobile applications described by the third block 544, the client-side engine prevents a user from accessing public mobile applications included on the blacklist, but allows the rest. Additionally, the runtime engine drops traffic related to public mobile applications included on the blacklist, but allows traffic related to other public mobile applications. For mobile applications described by the fourth block 546, the client-side engine prevents a user from accessing private mobile applications from a mobile device browser except for private mobile applications included on the whitelist. Additionally, the runtime engine drops traffic related to all private mobile applications 538 except private mobile applications included on the whitelist, which is allowed.

Figure 6:
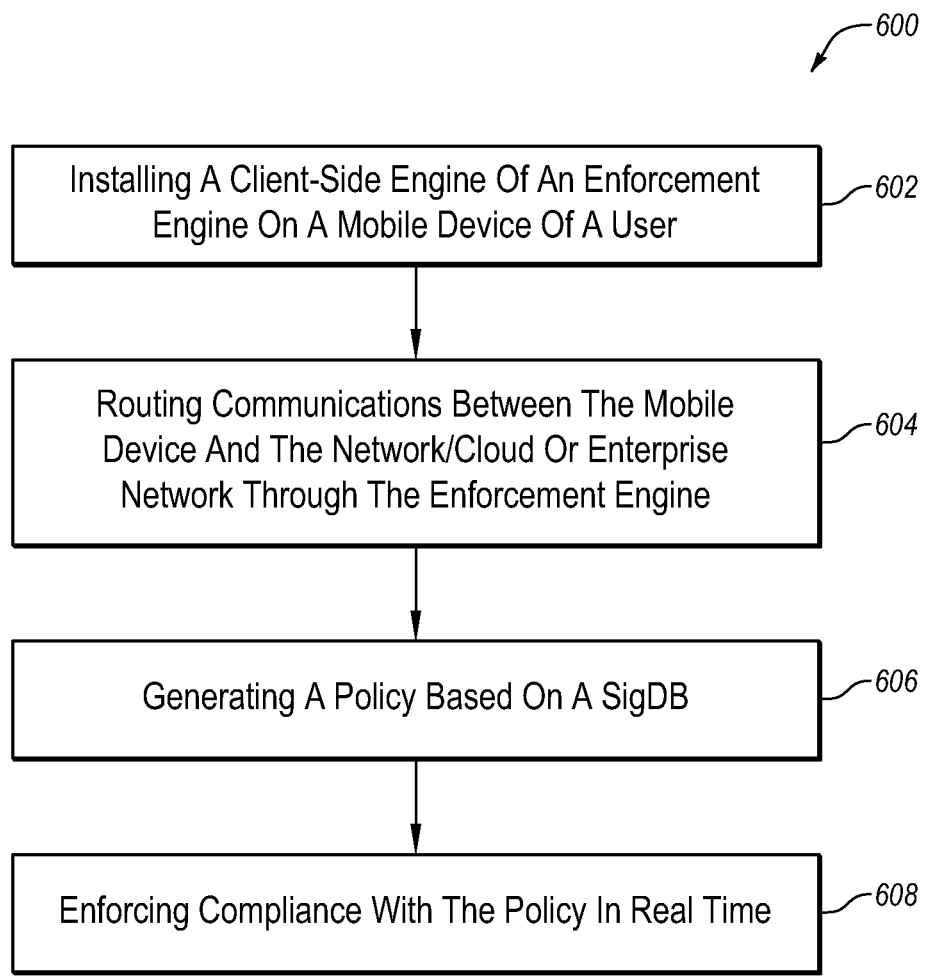
FIG. 6 is a flowchart of an example method of mobile device management that can be implemented the operating environment of FIG. 1B and may be performed by the mobile application management system of FIG. 3A.

FIG. 6 illustrates a flowchart of an example method 600 of mobile device management that can be implemented in the operating environment 100 of FIG. 1B and may be performed by the management system 300 of FIG. 3A in some embodiments. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The method 600 may begin at 602 by installing a client-side engine of an enforcement engine on a mobile device associated with a user. The client-side engine may be downloaded over the air ("OTA") according to some embodiments. Alternately or additionally, as part of or after completion of the installation, the client-side engine of the enforcement engine may be configured to prompt the user to authenticate the installation of the client-side engine. Additionally, the client-side engine may include a device guard.

At 604, the method 600 may include routing communications between the mobile device and the network/cloud or enterprise network through the enforcement engine. In some embodiments, the enforcement engine may include one or more runtime engines that may manage the communications between the mobile device and the network/cloud or enterprise network. The runtime engines may further include a MAACS engine and/or a cloud solution.

At 606, the method 600 may include generating a policy based on a SigDB that includes one or more signatures pertaining to one or more mobile applications. The SigDB may include signature criteria describing characteristics of the one or more mobile applications. In some embodiments, the policy may include one or more default rules, a blacklist, a whitelist, or some combination thereof.

At 608, the method 600 may include enforcing compliance with the policy. The enforcement strategy may occur at the client-side engine of the enforcement engine or at the runtime engine of the enforcement engine. In some embodiments, the policy may be communicated to the client-side engine such that the client-side engine blocks a mobile application included in the blacklist when launched on the mobile device and/or blocks mobile applications not allowed under the policy by default. Additionally or alternatively, enforcing the policy may include communicating the policy to the runtime engines. The runtime engines may drop the communications of traffic related to mobile applications included in the blacklist and/or drop the communications of traffic related not allowed under the policy by default. Regardless of whether the enforcement strategy occurs at the client-side engine and/or the runtime engine, in some embodiments, the enforcement strategy may occur in real-time.

Figure 7:
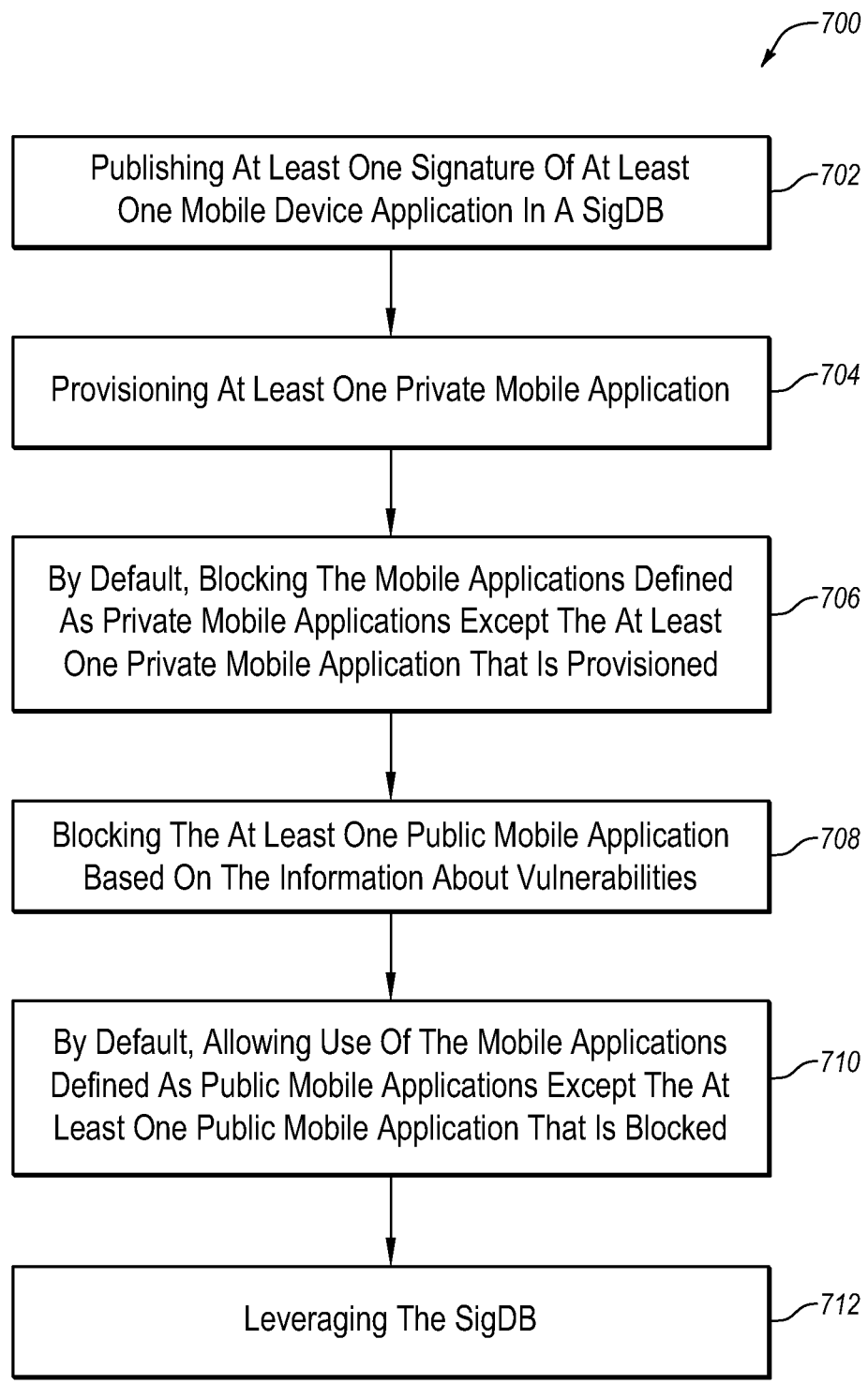
FIG. 7 is a flowchart of an example method of mobile application management that can be implemented in the operating environment of FIG. 1B and may be performed by the mobile application management system of FIG. 3A.

FIG. 7 illustrates a flowchart of an example method 700 of mobile application management that can be implemented in the operating environment 100 of FIG. 1B and may be performed by the management system 300 of FIG. 3A. The method 700 may be implemented in a BYOD environment. The method 700 may begin at 702. At 702, the method 700 may include publishing at least one signature of at least one mobile application in a SigDB. The signatures in the SigDB may be published by one or more SigDB input sources such as an enterprise, an enforcement engine administrator ("administrator"), a public source or some combination thereof.

In some embodiments, the signature includes information indicating whether the mobile application is a private mobile application or a public mobile application and information about vulnerabilities introduced to the enterprise by the mobile application. Additionally or alternatively, the signature of the mobile application may include whether the mobile application is a cloud-based mobile application or a native mobile application.

At 704, the method 700 may include provisioning at least one private mobile application. In some embodiments, provisioning may include enabling a first user to use the private mobile application. Use of the private mobile application may include accessing a cloud-based mobile application such as through a browser and/or launching and running a native mobile application.

At 706, the method 700 may include by default, blocking the mobile applications defined as private mobile applications except the at least one private mobile application that is provisioned. In some embodiments, blocking a mobile application includes preventing access to a cloud-based mobile application and stopping native mobile applications when launched locally at the mobile device.

At 708, the method 700 may include blocking at least one public mobile application based on the information about vulnerabilities. At 710, the method 700 may include by default, allowing use of the mobile applications defined as public mobile applications except the at least one public mobile application that is blocked.

In some embodiments of the method 700, enabling a first user to use the private mobile application, blocking the mobile applications, blocking the at least one public mobile applications, allowing use of the mobile applications define as public mobile applications, or some combination thereof occur in real-time.

At 712, the method 700 may include leveraging the SigDB, which includes enabling the enterprise to provision a plurality of the mobile applications based on a commonality or lack thereof in the information included in the signatures in the SigDB pertaining to the plurality of mobile applications. In some embodiments, leveraging the SigDB may include blocking multiple public mobile applications based on a commonality or lack thereof.

FIG. 8 is a block diagram illustrating an example computing device 800 that is arranged for performing mobile device management in accordance with the present disclosure. In a basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include policy enforcement algorithms 826 that are arranged to enforce the policy during use of the mobile device management system. Program data 824 may include the SigDB development programs 828 that may be useful for generating the policy as is described herein. In some embodiments, application 822 may be arranged to operate with program data 824 on operating system 820 such that communicating enterprise media content may be performed on the computing device 800.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836, and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of mobile device management, the method comprising:
    installing a client-side engine of an enforcement engine on a mobile device, wherein the enforcement engine further includes a runtime engine;
    routing communications between the mobile device and a network/cloud or an enterprise network through the enforcement engine;
    from a signature database ("SigDB") that includes signatures pertaining to mobile applications, generating a policy regarding the mobile applications, wherein the mobile applications include private mobile applications and public mobile applications;
    enforcing compliance of the mobile device with the policy in real time, wherein the policy includes a default rule allowing public mobile applications and blocking private mobile applications; a whitelist of one or more private mobile applications that are allowed; and a blacklist of one or more public mobile applications that are blocked.

2. The method of claim 1, the method further comprising dropping mobile application traffic related to the mobile applications that are blocked.

3. The method of claim 2, the method further comprising locally preventing mobile applications that are blocked from launching on the mobile device.

4. The method of claim 1, wherein the SigDB comprises at least one of:
    pre-populated signatures;
    threat data feeds; and
    enterprise-definable signatures.

5. The method of claim 1, wherein the enforcement engine comprises a cloud solution.

6. A method of mobile application management in a bring your own device ("BYOD") environment, the method comprising:
    publishing at least one signature of at least one mobile application in a signature database ("SigDB"), wherein the signature includes:
        information indicating whether the mobile application is a private mobile application or a public mobile application, and
        information about vulnerabilities introduced to an enterprise by the mobile application,
    provisioning at least one private mobile application, wherein provisioning includes enabling a first user to use the private mobile application;
    by default, blocking the mobile applications defined as private mobile applications except the at least one private mobile application that is provisioned;
    based on the information about vulnerabilities, blocking at least one public mobile application; and
    by default, allowing use of mobile applications defined as public mobile applications except the at least one public mobile application that is blocked.

7. The method of claim 6, wherein the signatures of the mobile applications include information indicating whether each corresponding mobile application is a cloud-based mobile application or a native mobile application; and
    wherein use of a mobile application includes at least one of:
        accessing a cloud-based mobile application, and
        launching and running a native mobile applications; and
    wherein blocking a mobile application includes at least one of:
        preventing access to a cloud-based mobile application, and stopping
        stopping a native mobile application when launched.

8. The method of claim 7, wherein enabling a first user to use the private mobile application, blocking the mobile applications, blocking the at least one public mobile applications, allowing use of the mobile applications defined as public mobile applications, or some combination thereof occur in real-time.

9. The method of claim 7, wherein provisioning a cloud-based mobile application further comprises:
    requiring virtual private network ("VPN") connectivity;
    requiring a secure wireless-fiber ("WiFi") connection; or
    allowing access via a public radio network.

10. The method of claim 6, wherein provisioning further includes enabling a second user to use a second private mobile application.

11. The method of claim 10, wherein the second user is an individual, an enterprise group, or the entire enterprise.

12. The method of claim 6, further comprising:
    leveraging the SigDB, which includes enabling the enterprise to selectively block a plurality of the mobile applications based on a commonality or lack thereof in the signatures in the SigDB pertaining to the plurality of mobile applications.

13. The method of claim 6, further comprising:
    leveraging the SigDB, which includes enabling the enterprise to provision a plurality of the mobile applications based on a commonality or lack thereof in the signatures in the SigDB pertaining to the plurality of mobile applications.

14. The method of claim 6, wherein the signatures further comprise at least one of:
    mobile application identifying information including a mobile application name and/or an application unique identifier;
    a mobile application binary code;
    a mobile application traffic uniform resource locator ("URL");
    a mobile application risk level;
    a mobile application type;
    a mobile application vulnerability; or
    a mobile application category that includes information indicating whether the mobile application is a utility, a game, a human resource application, a finance application, or an operational application.

15. The method of claim 6, further comprising updating the SigDB according to information received from a public source.

16. A bring-your-own-device ("BYOD") environment mobile application management system comprising:
    a computing device including a computer-readable medium having computer-executable instructions stored thereon that are executable by the computing device, the computer-executable instructions including:
        an enforcement engine including a client-side engine installed on a mobile device and a runtime engine installed on a network/cloud and/or an enterprise network, and
        a customizable policy;
    wherein when executed by the computing device:
        the enforcement engine manages in real time mobile applications on the mobile device and traffic related to mobile applications in the network/cloud, wherein the management in real time of mobile applications includes allowing public mobile applications except public mobile applications specifically blocked and blocking private mobile applications expect private mobile applications that are specifically allowed, and the customizable policy forms the basis of the enforcement engine management.

17. The system of claim 16, further comprising a SigDB that includes signatures including signature criteria that describe mobile applications, wherein the customizable policy is generated by an enterprise based on the SigDB.

18. The system of claim 17, wherein the SigDB is updatable according to information received from a public source.

19. The system of claim 17, wherein the signature criteria include at least one of:
- mobile application identifying information including a mobile application name and/or an application unique identifier;
- a mobile application binary code;
- a mobile application traffic uniform resource locator ("URL");
- a mobile application risk level;
- a mobile application type;
- a mobile application vulnerability; or
- a mobile application category that includes information indicating whether the mobile application is a utility, a game, a human resource application, a finance application, or an operational application.

20. The system of claim 17, wherein the signatures include information indicating whether each corresponding mobile application is a cloud-based mobile application or a native mobile application.

* * * * *